Patented Mar. 20, 1945

2,372,161

UNITED STATES PATENT OFFICE 2,372,161

SULPHURIZED AMIDES AND IMIDES OF CYCLIC SULPHONES

Rupert C. Morris and John L. Van Winkle, Berkeley, Calif., assignors to Shell Development Company, San Francisco, Calif., a corporation of Delaware No Drawing. Application July 27, 1943, Serial No. 496,365

5 Claims. (Cl. 260—128)

This invention relates to a novel and particularly useful class of compounds, and more particularly pertains to sulphurized derivatives of unsaturated amides and imides of cyclic sulphones. More specifically, the invention is directed to the reaction products formed by the addition of sulphur to substituted and unsubstituted sulpholanylamines and sulpholenylamines in which at least one of the hydrogen atoms of the amino radical is substituted by an unsaturated acyl radical.

The terms "sulpholanylamine" and "sulpholenylamine" refer to the amino derivatives of sulpholanes and sulpholenes, respectively, i. e. compounds in which at least one amino radical is directly attached to one of the nuclear carbon atoms of a sulpholane or sulpholene. The term "sulpholane" refers to a saturated cyclic structure containing four carbon atoms and a sulphur atom in the ring, the sulphur atom of this heterocylic saturated five-membered ring having two oxygen atoms attached thereto. This compound is otherwise termed "thiacyclopentane-1,1-dioxide," "thiolane - 1,1 - dioxide," "cyclotetramethylene sulphone," or "dihydrobutadiene sulphone." Similarly, the term "sulpholene" refers to an unsaturated sulpholane, i. e. a sulpholane containing an olefin linkage between two adjoining carbon atoms. This compound has also been called "thiacyclopentene - 1,1 - dioxide." The double bond may be between any two adjacent carbon atoms of the ring, the generic term sulpholene covering the simple unsubstituted 2-sulpholene (which is 2-thiolene-1,1-dioxide or alpha-butadiene sulphone), the unsubstituted 3-sulpholene (which is 3-thiolene-1,1-dioxide or beta-butadiene sulphone), and the substituted derivatives thereof, i. e. sulpholenes in which different organic and/or inorganic radicals are substituted for one or more of the hydrogen atoms of both simple unsubstituted sulpholenes. Similarly, the term sulpholane generically covers both the unsubstituted sulpholane having the general formula

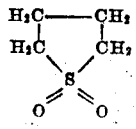

and the substituted derivatives of this compound.

It is an object of the present invention to provide a new class of chemical compounds. A further object is to provide a novel class of compounds possessing unexpectedly useful properties. Still other objects will be apparent from the description of the invention.

Broadly stated, the novel compounds of the present invention comprise the reaction products formed by the addition of sulphur to substituted and unsubstituted sulpholanylamines or sulpholenylamines containing at least one unsaturated acyl radical directly attached to the nitrogen atom of the amino (amido) radical. In other words, the novel compounds of the present invention consist of the sulphurized derivatives of reaction products of a substituted or unsubstituted sulpholanylamine or sulpholenylamine with an unsaturated carboxylic acid or its anhydride.

The unsaturated amides and imides suitable for the preparation of the novel class of sulphurized derivatives of the present invention are disclosed and claimed in the co-pending application of Theodore W. Evans, Rupert C. Morris, and Edward C. Shokal, Serial No. 495,377, filed July 19, 1943. As disclosed therein, the unsaturated amides or imides all contain one or more unsaturated acyl radicals attached to one or more nitrogen atoms of the substituted or unsubstituted sulpholanylamines or sulpholenylamines. In the case of the unsaturated amides of sulpholanylamines, i. e. the unsaturated amides in which at least one of the hydrogen atoms of the amino radical of the sulpholanylamine is substituted by an unsubstituted acyl radical, the compounds employed for the production of the novel sulphurized derivatives thereof may be represented by the general structural formula:

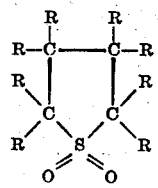

wherein at least one of the R radicals attached to a nuclear carbon atom is an unsaturated amido or imido radical, while the other R radicals attached to the nuclear carbon atoms are each a member of the group consisting of the hydrogen atom, a halogen atom, the hydroxyl radical, and an organic radical, preferably a hydrocarbon radical, such as an alkyl, alkenyl, cycloalkyl, cycloalkenyl, aryl, aralkyl or alkaryl group. In other words, the above described compounds which may be sulphurized to produce the novel derivatives all contain one or more of the following radicals directly attached to the same or different nuclear carbon atoms of the sulphone ring:

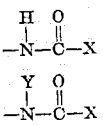

and

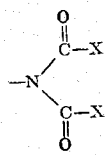

wherein Y is an organic and preferably a hydrocarbon radical, and X represents the same or different unsaturated organic radicals and preferably unsaturated aliphatic or alicyclic radicals containing one or more unsaturated linkages between two carbon atoms of aliphatic character.

A preferred subgroup of amides which may be sulphurized to form a preferred subclass of novel sulphurized derivatives comprises compounds having the general structural formula:

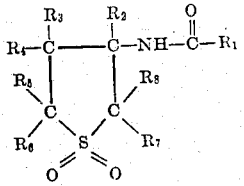

in which $R_1$ is an unsaturated organic radical, preferably an unsaturated hydrocarbon radical which may be an alkenyl or cycloalkenyl group or a suitable substituted derivative thereof such as an unsaturated halo-substituted alkenyl or cycloalkenyl radical, while $R_2$ through $R_8$ are each a member of the group consisting of the hydrogen atom, a halogen atom, the hydroxyl radical and an organic radical, preferably a hydrocarbon radical.

The unsaturated amides or imides which may be sulphurized to produce a novel class of sulphurized derivatives may in turn be prepared by reacting, preferably via a condensation reaction, an unsaturated carboxylic acid or the corresponding unsaturated anhydride with a cyclic sulphone, preferably a sulpholane containing an amino radical directly attached to one of the nuclear carbon atoms. Also, these unsaturated amides and imides may be produced by an ester exchange reaction. As examples of the amino-substituted cyclic sulphones which may thus be reacted with the unsaturated carboxylic acids or their anhydrides, reference is made to 3-sulpholanylamine, 3-sulpholenylamine, as well as other sulpholanylamines and sulpholenylamines containing various substituents and particularly alkyl radicals attached to the various nuclear carbon atoms, e. g. 2-methyl-3-sulpholanylamine and 2,4-dimethyl-4-sulpholanylamine.

The unsaturated carboxylic acids which may be employed as one of the reactants in the production of the mentioned unsaturated amides and imides are characterized by possessing a carboxylic group linked to an organic substituent containing at least one unsaturated linkage between two carbon atoms of aliphatic character.

The following are examples of the unsaturated carboxylic acids which may be employed as a reactant: acrylic, crotonic, isocrotonic, alpha-methyl acrylic, vinyl acetic, beta-ethyl acrylic, beta-vinyl acrylic, beta-beta-dimethyl acrylic, beta-pentenoic, allyl acetic, angelic, tiglic, hydrosorbic, sorbic, teracrylic, myristolenic, oleic, linoleic, linolenic, maleic, fumaric, citraconic, mesaconic, itaconic, glutaconic, and the like, and their homologues and analogues, and suitable substitution products, e. g. halogenated derivatives, such as chloroacrylic and chlorocrotonic acids. Although the generic group is intended to include all unsaturated carboxylic acids and anhydrides containing one or more unsaturated bonds between two carbon atoms of aliphatic character, a preferred subgroup comprises the unsaturated fatty acids.

As brought out more specifically in the above-mentioned co-pending application, the formation of the amides or imides may be effected in the presence or absence of various catalysts and may be executed in a variety of different manners such as, for example, by heating the unsaturated acid or anhydride in contact with the amino derivative of the cyclic sulphone, this heating being preferably realized at or about the boiling temperature of the reaction mixture at atmospheric pressure and with or without refluxing. Also, it was brought out that it is preferable to employ addition agents such as benzene to facilitate the removal of the water formed as the result of the condensation reaction.

The following is a specific example of one method of forming the unsaturated amides which may then be sulphurized in accordance with the process of the present invention to form the novel and useful sulphurized derivatives.

Approximately 70 grams (0.25 mol) of oleic acid, about 36 grams (0.25 mol) of 3-sulpholanylamine, and about 100 cc. of benzene were introduced into a still and heated with refluxing to separate the water formed as a by-product of the reaction. Thereafter, the benzene was distilled off by heating to a temperature of about 200° C. The residual material was then introduced into a flask and washed with diethyl ether to remove any unreacted oleic acid. The solid residue was then filtered off, washed with hot water to remove any unreacted sulpholanylamine, re-filtered, and finally dried by heating for about 2 hours at a temperature of about 100° C. and a pressure of between about 1 and 2 mm. of mercury. The final product, which was found by analysis to be N-(3-sulpholanyl) oleylamide, is a waxy material, substantially insoluble in kerosene, and having a melting point of about 87° C. to 88° C.

The novel sulphurized derivatives may be prepared by reacting the aforesaid unsaturated amides and imides with sulphur, preferably at an elevated temperature and for a period of time sufficient to effect the desired addition of sulphur to the unsaturated linkage or linkages of the unsaturated radical attached to the sulphone ring and particularly of the unsaturated acyl radical or radicals attached to the nitrogen atom, which in turn is directly connected to a nuclear carbon atom of the sulphone ring. Although there is no intention of being limited by any theory of the case, it is believed that the sulphur attaches itself at said unsaturated linkage to form an olefin sulfide radical

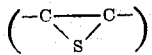

Obviously, when the unsaturated acyl radical contains more than one unsaturated linkage, it is possible to add the sulphur in an amount sufficient to satisfy all of these bonds or only part of these olefinic or acetylenic linkages. This may be effected by controlling the amount of sulphur added as well as by regulating the reaction period and/or the temperature employed. Also, when the unsaturated sulpholanyl or sulpholenyl amides or imides contain other unsaturated radicals attached to the sulphone ring, the reaction with sulphur may result in the addition of the sulphur to one or more of the double bonds of such unsaturated radicals, the amount of sulphur thus added being controlled in the manner described hereinabove.

The following is an example of one illustrative embodiment of a method for the preparation of the novel products resulting from the sulphurization of unsaturated sulpholanylamides, it being understood that there is no intention of being limited to any specific proportions or conditions described.

Substantially equimolal amounts of sulphur and N-(3-sulpholanyl) oleylamide were heated in an atmosphere of nitrogen for a period of about 18 hours at a temperature which varied between about 166° C. and about 172° C. The reaction product was then taken up in a hydrocarbon fraction predominating in octanes to remove any unreacted sulphur. After separation of the solution the octanes were evaporated, thus leaving a reaction product comprising the product of sulphurization of the N-(3-sulpholanyl) oleylamide, which product is believed to have the following structural formula:

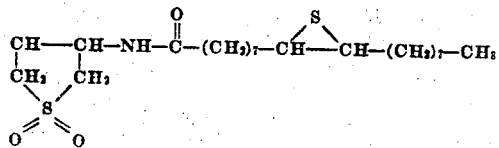

Although the novel sulphurized products of the present invention, which as stated are formed by the sulphurization of the above-defined class of unsaturated amides and imides of cyclic sulphones, find utility in a large variety of industries, these compounds have been found to be particularly suitable as addition agents to lubricating oils and greases to reduce corrosive and/or abrasive wear and scuffing. Generally, when added to lubricating oils to improve wear resistance, the amounts required normally vary from about 0.1% to about 10%, preferably 0.5% to 5%, depending upon the conditions to be met. If complete solubility of the addition agent is required, its solubility limit in the lubricating oil frequently sets an upper limit which can be safely incorporated. However, complete solubility of the addition agent is not always essential; for example, compounds having extreme pressure properties may merely be suspended in lubricating oils and yet be effective. Also, sulphurized products of the above class which are substantially insoluble or only slightly soluble in oils may be useful in greases with which these agents may form substantially stable plastic mixtures.

The advantages derived from employing the above described sulphurized compounds as addition agents in lubricating oils may be seen from the following example:

A sample of a western lubricating oil, S. A. E. 30 grade, was divided into two portions. One of these portions was mixed with about 1.3% by weight of the above-described product of sulphurization of N-(3-sulpholanyl) oleylamide. Both the dope and the undoped oils were then tested by a test known as the thrust bearing corrosion test, which is carried out in the following manner: A hardened steel disc is made to rotate at a rate of 2400 R. P. M. for 20 hours under constant pressure of 125 lbs. per sq. in. against three flat copper lead bearings. The bearing assembly rests in a steel cup filled with the oil to be tested. The oil is maintained at a temperature of 170° C. by thermostatic control. The bearings are weighed before and after the test, the difference in weight representing the loss sustained during the test. The results of these tests were as follows:

| Addition agent | Bearing wt. loss in mg./cm.² |
| --- | --- |
| None | 26.0 |
| 1.3% sulphurized N-(3-sulpholanyl) oleylamide | 1.0 |

We claim as our invention:
1. Sulphurized N-(3-sulpholanyl) oleylamide.
2. A sulphurized amide of 3-sulpholanylamine and an unsaturated carboxylic acid.
3. A sulphurized amide of a sulpholanylamine and an unsaturated carboxylic acid.
4. A sulphurized amide of an unsaturated carboxylic acid and a sulpholanylamine wherein at least one of the hydrogen atoms linked to a carbon atom in the ring has been replaced by an alkyl radical.
5. A sulphurized amide of an unsaturated carboxylic acid and a sulpholanylamine wherein the nuclear carbon atoms are directly attached to members of the group consisting of the hydrogen atom and hydrocarbon radicals.

RUPERT C. MORRIS.
JOHN L. VAN WINKLE.